US011504815B2

(12) United States Patent
Schroeder et al.

(10) Patent No.: US 11,504,815 B2
(45) Date of Patent: Nov. 22, 2022

(54) METHOD FOR PRODUCING A CUT SECTION FOR A DRILL BIT

(71) Applicant: Hilti Aktiengesellschaft, Schaan (LI)

(72) Inventors: Florian Schroeder, Maienfeld (CH); Guenter Domani, Weissensberg (DE); Pingyan Rong, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 55 days.

(21) Appl. No.: 16/954,463

(22) PCT Filed: Dec. 13, 2018

(86) PCT No.: PCT/EP2018/084733
§ 371 (c)(1),
(2) Date: Jun. 16, 2020

(87) PCT Pub. No.: WO2019/121314
PCT Pub. Date: Jun. 27, 2019

(65) Prior Publication Data
US 2021/0078119 A1    Mar. 18, 2021

(30) Foreign Application Priority Data
Dec. 21, 2017   (EP) .................................... 17209398

(51) Int. Cl.
*B23P 15/28*       (2006.01)
*B23B 51/04*       (2006.01)
(52) U.S. Cl.
CPC .............. *B23P 15/28* (2013.01); *B23B 51/04* (2013.01)

(58) Field of Classification Search
CPC ............................ B23P 15/28; B23B 51/0406
See application file for complete search history.

(56) References Cited

U.S. PATENT DOCUMENTS

| 4,362,161 A * | 12/1982 | Reimels ................. B23B 51/10 606/173 |
| 2009/0293981 A1 | 12/2009 | Berg |
| 2015/0190146 A1* | 7/2015 | Stephane ................. A61C 3/02 433/165 |
| 2015/0343539 A1 | 12/2015 | Hoop |
| 2016/0045206 A9* | 2/2016 | Stephane ................ B23B 51/04 433/165 |
| 2021/0031279 A1* | 2/2021 | Galiber ............... B23B 51/0473 |

FOREIGN PATENT DOCUMENTS

| EP | 1857194 A1 | 11/2007 |
| GB | 1583860 A | 2/1981 |
| WO | WO 2014/096359 A1 | 6/2014 |

OTHER PUBLICATIONS

International Search Report of PCT/EP2018/084733, dated Mar. 11, 2019.

* cited by examiner

*Primary Examiner* — Omar Flores Sanchez
(74) *Attorney, Agent, or Firm* — Davidson, Davidson & Kappel, LLC

(57) ABSTRACT

A method for producing a cutting section from a closed tubular element (14) which is in the form of a hollow cylinder and from one or more drill segments (16) which are connected to the closed tubular element (14).

12 Claims, 5 Drawing Sheets

METHOD FOR PRODUCING A CUT SECTION FOR A DRILL BIT

TECHNICAL FIELD

The present invention relates to a method for producing a cutting segment for a drill bit.

BACKGROUND

WO 2014/096359 A1 discloses a cutting section for a drill bit, which cutting section is connectable to a drill shaft section of the drill bit via a releasable connecting device. The releasable connecting device is designed here as a combined push and twist connection. A "push and twist connection" refers to releasable connections between a first and a second connecting element, said connecting elements forming a push connection in one direction and being additionally connected via a twist connection. The cutting section comprises one or more drill segments, a ring section, an outer push element and an annular stop shoulder at the transition from the ring section to the outer push element.

Cutting sections which are connectable with a combined push and twist connection are sold under the product name "Hilti DD X-CM". The "Hilti DD X-CM" cutting sections comprise a plurality of drill segments, a ring section and an outer push element, wherein an annular stop shoulder for transmitting forces is located at the transition from the ring section to the outer push element. Torque is transmitted by means of pin elements which interact with slot-shaped recesses in the outer push element. The "Hilti DD X-CM" cutting sections are produced from a closed tubular element. In this case, the annular stop shoulder is produced by turning and the slot-shaped recesses are produced by milling.

SUMMARY OF THE INVENTION

Disadvantages of the known "Hilti DD X-CM" cutting sections are the high outlay on production due to the turning of the annular stop shoulder and the milling of the slot-shaped recesses. In addition, the choice of material for the ring section and the outer push element is limited. Since the "Hilti DD X-CM" cutting sections are produced from a closed tubular element, a compromise has to be made in the choice of material in terms of the demands made of the cutting section regarding transmission of force, transmission of torque and tensile loadings during removal of a jammed drill bit.

An object of the present invention, in a method for producing a cutting section for a drill bit, is to reduce the manufacturing outlay for the production of the cutting section. In addition, the intention is for the functionality of the cutting section during drilling with the drill bit to be improved in respect of transmission of force, transmission of torque and/or tensile loadings during removal of a jammed drill bit.

The cutting section produced with the method according to the invention for a drill bit is connected to a drill shaft section of the drill bit via a releasable connecting device. The method for producing a cutting section for a drill bit is characterized by the following method steps:
- a first sheet metal part, which has a first height between first end surfaces, a first length between first abutting edges and a first sheet metal thickness, is manufactured,
- a second sheet metal part, which has a second height between second end surfaces, a second length between second abutting edges and a second sheet metal thickness, is manufactured, wherein the first height is smaller than the second height and the first length is smaller than the second length,
- the first and second sheet metal parts are aligned with each other, wherein the first sheet metal part is arranged on the second sheet metal part,
- the first and second sheet metal parts are connected to each other in the aligned state to form a double sheet metal part,
- the double sheet metal part is formed into an open tubular element, wherein the first sheet metal part is arranged on the inner side of the open tubular element,
- the open tubular element is connected at least at the second abutting edges of the second sheet metal part to form a closed tubular element, and
- one or more drill segments are connected to the closed tubular element.

The cutting section which is produced with the aid of the method according to the invention comprises a closed tubular element, which is assembled from a first tubular element and a second tubular element, and at least one drill segment. The closed tubular element is produced from a first sheet metal part and a second sheet metal part. The first sheet metal part is in the form of a flat sheet metal part of a first sheet metal thickness, which has a first height between first end surfaces and a first length between first abutting edges. The second sheet metal part is in the form of a flat sheet metal part of a second sheet metal thickness, which has a second height between second end surfaces and a second length between second abutting edges. The first sheet metal part and the second sheet metal part are aligned with each other and are connected to each other in the aligned state to form a double sheet metal part. The double sheet metal part is formed into an open tubular element and connected at least at the second abutting edges of the second sheet metal part to form the closed tubular element.

The cutting section is designed in such a manner that force is transmitted to the cutting section via the first tubular element and torque is transmitted to the cutting section via the second tubular element. The first upper end surface of the first tubular element forms an annular stop shoulder which is used for transmitting force. A drill shaft section transmits the force to the annular stop shoulder by means of an annular end surface. Torque is transmitted, for example, via pin elements of the drill shaft section which interact with slot-shaped recesses in the second closed tubular element. By separation of the cutting section into the first tubular element and the second tubular element, the different demands made of the cutting section in respect of transmission of force and transmission of torque can be taken into consideration.

In addition, by separation of the cutting section into the first tubular element and the second tubular element, the manufacturing outlay for producing the cutting section can be reduced. The first upper end surface forms the annular stop shoulder for transmitting force, thus obviating the need for turning. The first tubular element and the second tubular element are in the form of hollow cylinders having circular ring-shaped cross sections and have a constant material thickness.

The closed tubular element is preferably additionally connected at the first abutting edges of the first sheet metal part. The open tubular element is particularly preferably simultaneously connected at the first abutting edges of the first sheet metal part and the second abutting edges of the second sheet metal part.

At least one slot-shaped recess is preferably created in the second sheet metal part, wherein the at least one slot-shaped recess comprises a transverse slot and a connecting slot, and the connecting slot connects the transverse slot to the second upper end surface of the second closed tubular element. The at least one slot-shaped recess is part of the releasable connecting device which connects the cutting section to a drill shaft section of the drill bit. The slot-shaped recess is T-shaped or L-shaped and, in the connected state of the drill bit, permits a relative movement between the cutting section and the drill shaft section. The relative movement between the cutting section and the drill shaft section enables a jammed cutting section to be released from the substrate.

Particularly preferably, at least one transverse groove is created in the second sheet metal part, wherein the at least one transverse groove is arranged level with the connecting slot of the at least one slot-shaped recess. The at least one transverse groove is part of the releasable connecting device which connects the cutting section to a drill shaft section of the drill bit. The width of the transverse groove is greater than or equal to the width of the transverse slot of the at least one slot-shaped recess. A matching transverse lug of a drill shaft section engages in the transverse groove of the cutting section. The transverse groove and transverse lug form an additional form fitting connection which prevents the push and twist connection from being unintentionally opened during release of a jammed drill bit and the drill shaft section from being removed from the substrate without the cutting section.

At least one internal depression is preferably created in the first sheet metal part, which internal depression extends over the first hollow cylinder height. The at least one internal depression in the first inner lateral surface can form a transport channel for a cooling and rinsing liquid and enables the formation of cutting sections with small internal protrusions of the drill segments on the inner side of the cutting section. The width, depth, shape and/or number of the at least one internal depression are adapted to the required quantity of cooling and rinsing liquid.

In a preferred development, the first sheet metal part is produced from a first material and the second sheet metal part from a second material. The cutting section produced with the method according to the invention is designed in such a manner that force is transmitted to the cutting section via the first tubular element and torque is transmitted to the cutting section via the second tubular element. By separation of the cutting section into the first tubular element and the second tubular element, the choice of the first material and of the second material can be adapted to the different demands made of the cutting section in respect of transmission of force and transmission of torque. In addition, the second material can be adapted in respect of tensile loadings during the removal of a jammed drill bit.

The second sheet metal part is preferably formed at the second abutting edges with at least one second positive form fitting element and at least one corresponding second negative form fitting element, wherein the at least one second positive form fitting element and the at least one second negative form fitting element are connected in a form fitting manner. The connection of the second abutting edges via second form fitting elements has the advantage that heat which may lead to stresses in the second tubular element is not admitted into the second tubular element.

BRIEF DESCRIPTION OF THE DRAWINGS

Exemplary embodiments of the invention are described hereinafter with reference to the drawing. It is not necessarily intended for this to illustrate the exemplary embodiments to scale; instead, the drawing, where conducive to elucidation, is produced in schematic and/or slightly distorted form. It should be taken into account here that various modifications and variations relating to the form and detail of an embodiment may be undertaken without departing from the general concept of the invention. The general concept of the invention is not limited to the exact form or the detail of the preferred embodiment shown and described hereinafter or limited to subject matter that would be limited compared with the subject matter claimed in the claims. For given dimensioning ranges, values within the stated limits should also be disclosed as limit values and can be used and claimed as desired. For the sake of simplicity, the same reference numerals are used below for identical or similar parts or parts with identical or similar functions.

In the figures.

DETAILED DESCRIPTION

Figure 1A:
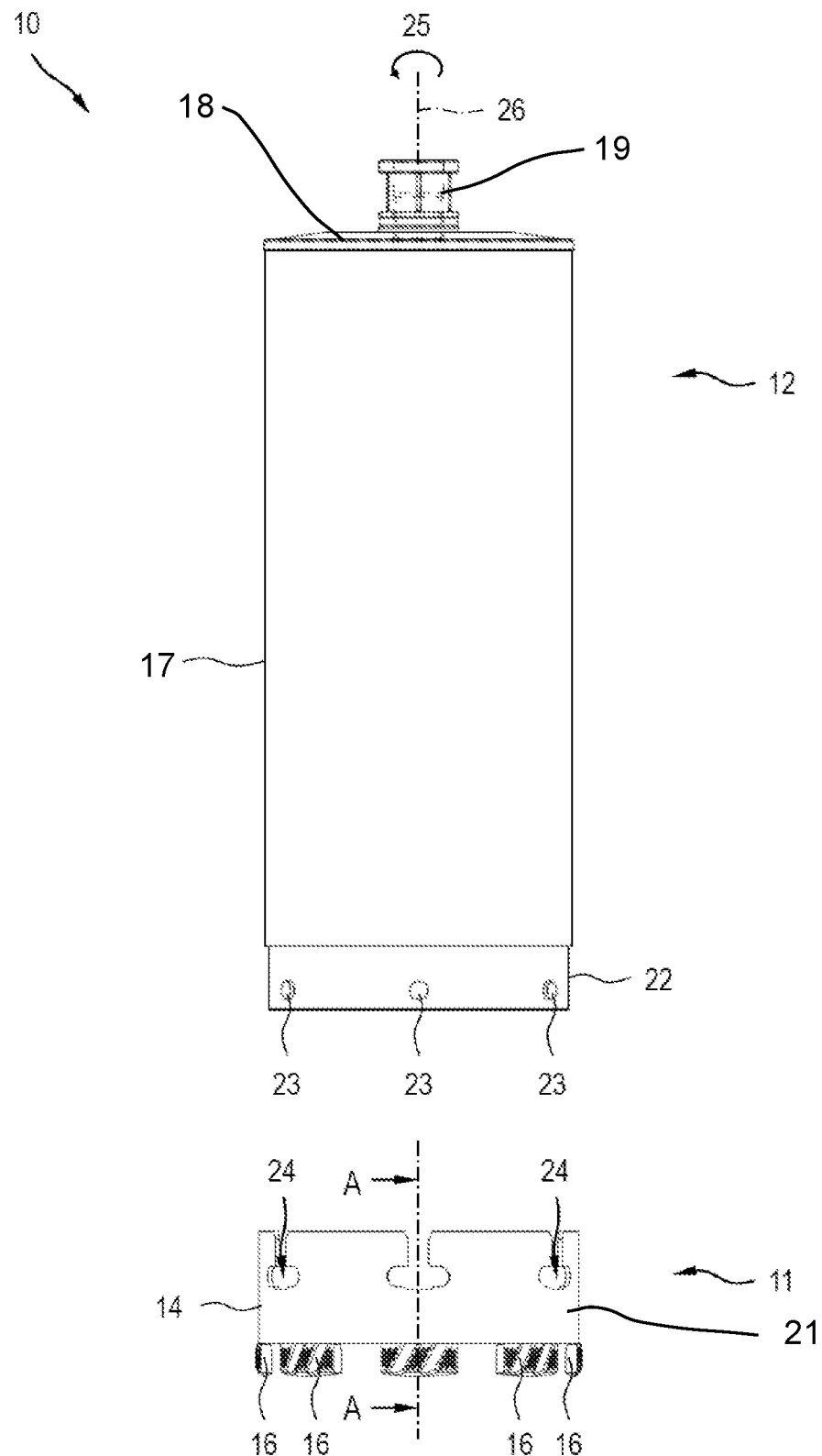
FIGS. 1A and 1B show a drill bit with a cutting section and a drill shaft section, which are connectable via a releasable connecting device, in an unconnected state of the drill bit (FIG. 1A) and in a connected state of the drill bit (FIG. 1B)
Figure 1B:
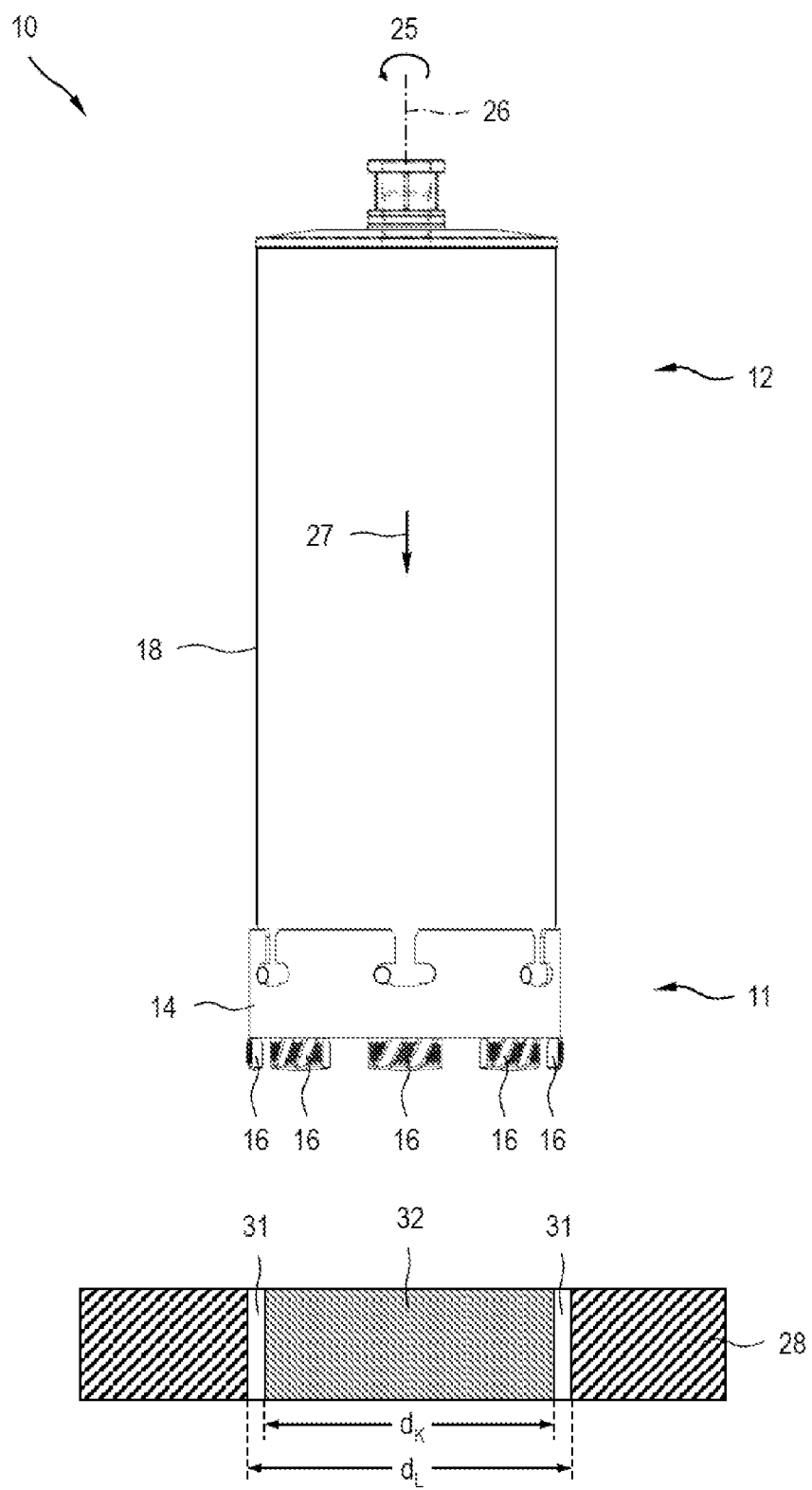

FIGS. 1A and 1B show a drill bit 10 which comprises a cutting section 11 and a drill shaft section 12, wherein the cutting section 11 and the drill shaft section 12 are connectable via a releasable connecting device 13. In this case, FIG. 1A shows the cutting section 11 and drill shaft section 12 in an unconnected state of the drill bit, and FIG. 1B shows the cutting section 11 and drill shaft section 12 in a connected state of the drill bit.

The cutting section 11 comprises a closed tubular element 14 and a plurality of drill segments 16 which are connected to the closed tubular element 14. The cutting section 11 is produced with the aid of the method according to the invention for producing a cutting section. The tubular element 14 is produced from two flat sheet metal parts which are connected to each other and are formed into an open tubular element. The open tubular element becomes a closed tubular element by connection of the abutting edges.

The drill segments 16 are arranged annularly and form a drill ring with intermediate spaces. Instead of a plurality of drill segments 16, the cutting section 11 can also have an individual drill segment in the form of a closed drill ring. The drill segments 16 can be welded, soldered or screwed to the closed tubular element 14 or fastened to the closed tubular element 14 using another suitable type of fastening. The drill shaft section 12 comprises a tubular drill shaft 17, a cover 18 and a shank 19 via which the drill bit 10 is fastened in a tool fitting of a core drill.

The releasable connecting device 13 is in the form of a combined push and twist connection, as disclosed in WO 2014/096359 A1. The releasable connecting device 13 comprises a first push element 21 which is integrated in the cutting section 11, and a second push element 22 which is integrated in the drill shaft section 12. The first and second push elements 21, 22 form a push connection and are additionally secured via a twist connection. The twist connection comprises a plurality of pin elements 23 which are introduced into slot-shaped recesses 24. The pin elements 23 are fastened to an outer side of the second push element 22, and the slot-shaped recesses 24 are provided in the first push element 21. The cutting section 11 can be connected simply and rapidly to the drill shaft section 12 by the operator. For this purpose, the cutting section 11 with the first push element 21 is pushed onto the second push element 22 of the drill shaft section 12 in such a manner that the pin elements 23 are arranged in the slot-shaped recesses 24.

In the drilling mode, the drill bit 10 is driven by a core drill in a direction of rotation 25 about an axis of rotation 26, wherein the axis of rotation 26 coincides with a longitudinal axis of the tubular drill shaft 17. During the rotation of the drill bit 10 about the axis of rotation 26, the drill bit 10 is moved in a feed direction 27 into a workpiece 28, with the feed direction 27 running parallel to the axis of rotation 26. In the workpiece 28, the drill bit 10 produces a drill hole 31 with a drill hole diameter $d_L$ and a drill core 32 with a core diameter $d_K$. The drill segments 15 form a drill ring with an outside diameter which corresponds to the drill hole diameter $d_L$ and with an inside diameter which corresponds to the core diameter $d_K$.

Figure 2A:
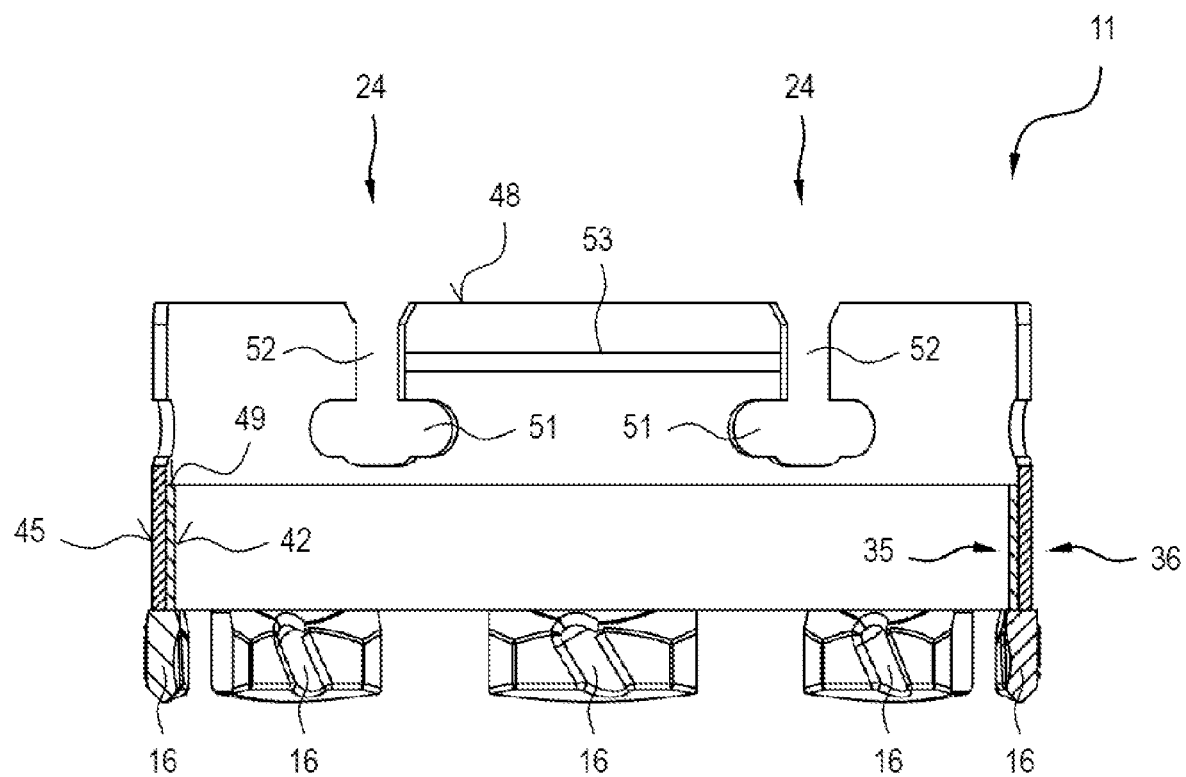
FIGS. 2A, 2B and 2C show the cutting section of FIG. 1 consisting of a closed tubular element and a plurality of drill segments (FIG. 2A showing all and FIG. 2B showing the first closed tubular element and FIG. 2C the second closed tubular element) in a longitudinal section along the section line A-A in FIG. 1A.
Figure 2B:
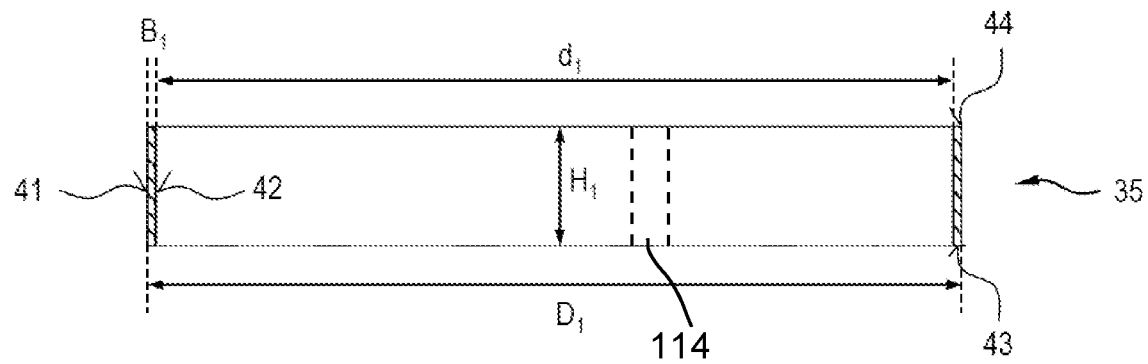
Figure 2C:
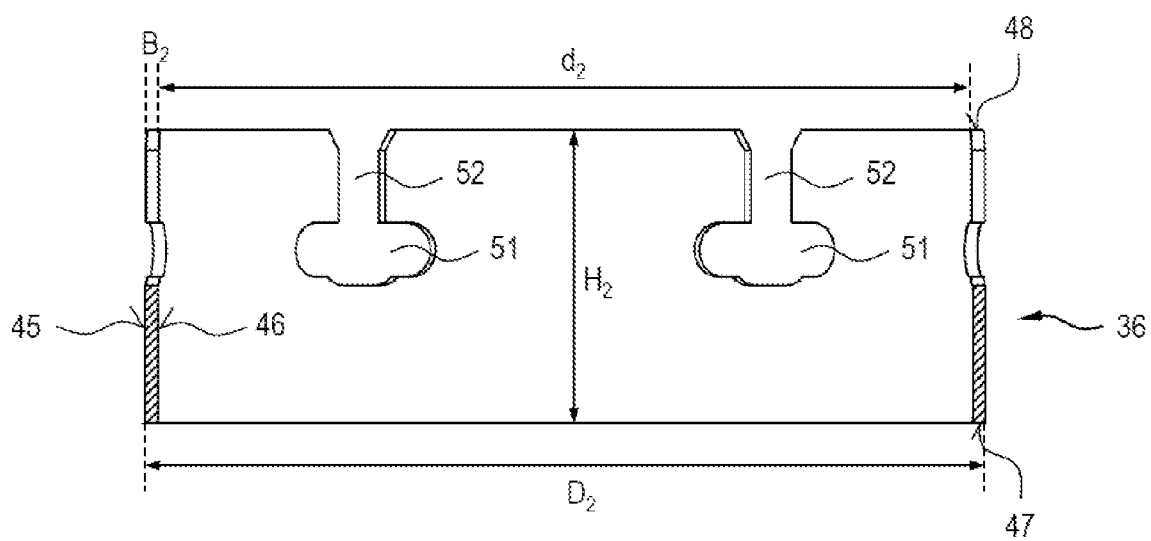

FIGS. 2A, 2B and 2C show the cutting section 11 of FIG. 1 with the closed tubular element 14 and the drill segments 16 in a longitudinal section along the section line A-A in FIG. 1A. The tubular element 14 is assembled from a first tubular element 35 (FIG. 2B) and a second tubular element 36 (FIG. 2C).

As shown in FIG. 2B, the first tubular element 35 is in the form of a first hollow cylinder having a circular ring-shaped cross-sectional area. The first tubular element 35 comprises a first outer lateral surface 41, a first inner lateral surface 42, a first lower end surface 43 and a first upper end surface 44. The dimensions of the first tubular element 35 are defined by a first hollow cylinder height $H_1$, a first inside diameter $d_1$ and a first outside diameter $D_1$. The width of the first tubular element 35 is produced as half the difference of the first outside diameter $D_1$ and the first inside diameter $d_1$ and is referred to as the first width $B_1$. In the first inner lateral surface 42 the first open tubular element 35 preferably has at least one internal depression 114 which extends over the first hollow cylinder height $H_1$.

As shown in FIG. 2C, the second tubular element 36 is in the form of a second hollow cylinder having a circular ring-shaped cross-sectional area. The second tubular element 36 comprises a second outer lateral surface 45, a second inner lateral surface 46, a second lower end surface 47 and a second upper end surface 48. The dimensions of the second tubular element 36 are defined by a second hollow cylinder height $H_2$, a second inside diameter $d_2$ and a second outside diameter $D_2$. The width of the second tubular element 36 is produced as half the difference of the second outside diameter $D_2$ and the second inside diameter $d_2$ and is referred to as the second width $B_2$.

The first lower end surface 43 of the first tubular element 35 and the second lower end surface 47 of the second tubular element 36 are aligned flush. The flush alignment of the first lower end surface 43 and the second lower end surface 47 has the advantage that a wide attachment surface for the drill segments 16 arises, at which the drill segments 16 can be connected to the first tubular element 35 and to the second tubular element 36.

The cutting section 11 is designed in such a manner that force is transmitted from the drill shaft section 12 to the cutting section 11 via the first tubular element 35 and torque is transmitted from the drill shaft section 12 to the cutting section 11 via the second tubular element 36. The first upper end surface 44 of the first tubular element 35 forms an annular stop shoulder 49 on the inner side of the cutting section 11 for the transmission of force from a connected drill shaft section. Torque is transmitted from the drill shaft section 12 to the cutting section 11 via the pin elements 23 and the slot-shaped recesses 24. The second tubular element 36 of the cutting section 11 has a plurality of slot-shaped recesses 24 on the second upper end surface 48. The slot-shaped recesses 24 each comprise a transverse slot 51 and a connecting slot 52, wherein the connecting slot 52 connects the transverse slot 51 to the second upper end surface 48. A transverse groove 53 is created in the second tubular element 36.

The first tubular element 35 can be produced from a first material and the second tubular element 36 from a second material. By separation of the cutting section 11 into the first tubular element 35 and the second tubular element 36, the choice of the first material and of the second material can be adapted to the different demands made of the first tubular element 35 and of the second tubular element 36.

Figure 3A:
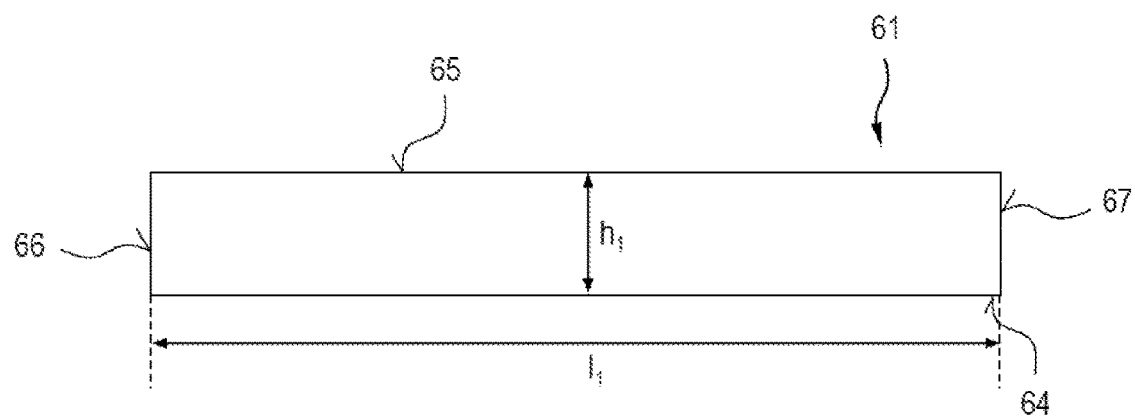
FIGS. 3A, 3B and 3C show a first sheet metal part (FIG. 3A) and a second sheet metal part (FIG. 3B), which are connected to form a double sheet metal part (FIG. 3C).
Figure 3B:
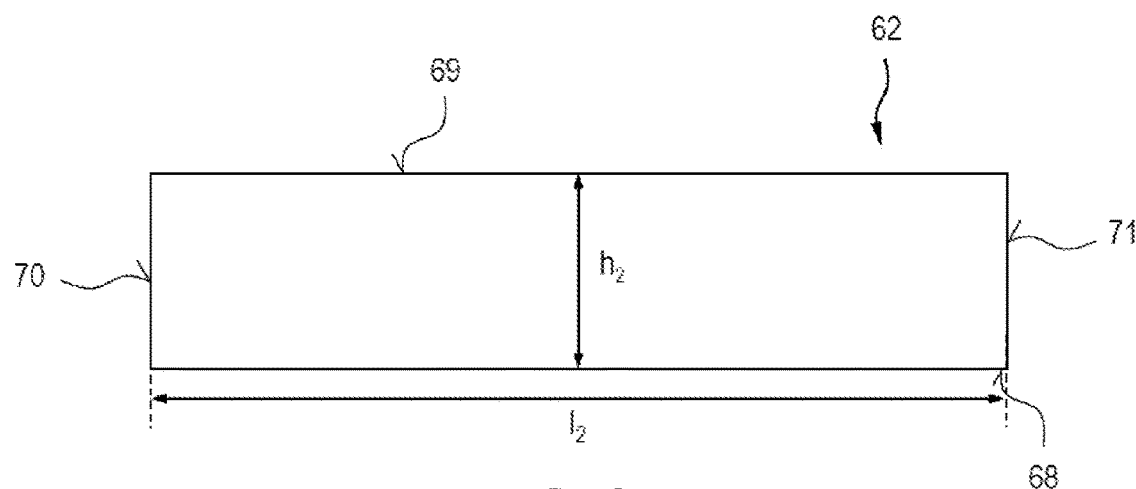
Figure 3C:
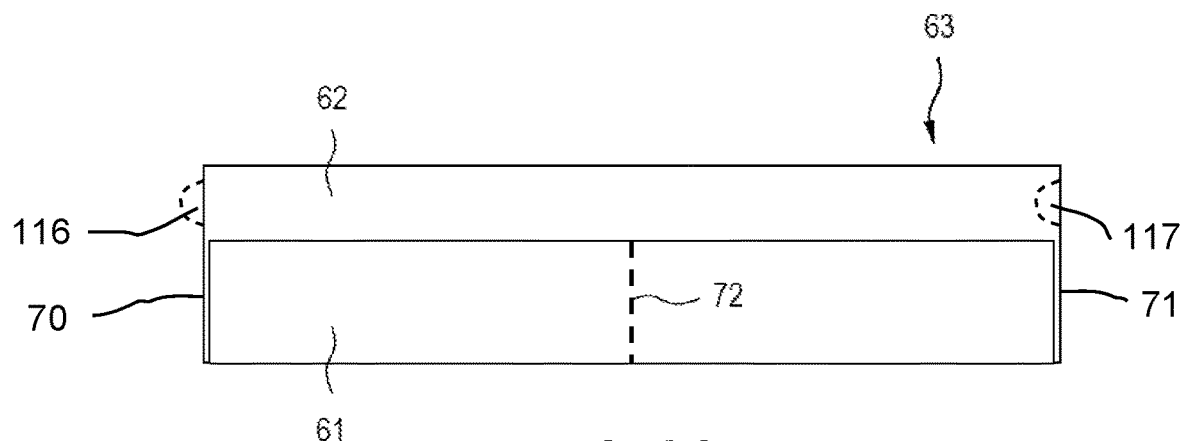

FIGS. 3A, 3B and 3C show a first sheet metal part 61 (FIG. 3A) and a second sheet metal part 62 (FIG. 3B), which are connected to form a double sheet metal part 63. The closed tubular element 14 of the cutting section 11 is produced from the first sheet metal part 61 and the second sheet metal part 62 with the aid of the method according to the invention.

The first sheet metal part 61 is in the form of a flat sheet metal part of a first sheet metal thickness $B_1$, (see FIG. 2A), which has a first height $h_1$ between first end surfaces 64, 65 and a first length $I_1$ between first abutting edges 66, 67. The second sheet metal part 62 is in the form of a flat sheet metal part of a second sheet metal thickness $B_2$, (see FIG. 2B), which has a second height $h_2$ between second end surfaces 68, 69 and a second length $I_2$ between second abutting edges 70, 71.

The first sheet metal part 61 and the second sheet metal part 62 are aligned with each other, wherein the first sheet metal part 61 is arranged on the second sheet metal part 62. In the exemplary embodiment, the first lower end surface 64 and the second lower end surface 68 are aligned flush. The first and second sheet metal parts 61, 62 are connected to each other in the aligned state with the aid of a weld seam 72 to form the double sheet metal part 63. The weld seam is placed in the region of the center of the first and second sheet metal parts 61, 62.

As shown schematically, the second sheet metal 62 can be connected at edges 70, 71 in an interlocking manner with a respective second positive interlocking element 116 and a second negative interlocking element 117. Both metal sheets 61 and 62 could also have such interlocking elements.

The invention claimed is:

1. A method for producing a cutting section for a drill bit, the cutting section connectable to a drill shaft section of the drill bit via a releasable connecting device, the method comprising the following steps:

manufacturing a first sheet metal part having a first height between first end surfaces, a first length between first abutting edges and a first sheet metal thickness;

manufacturing a second sheet metal part having a second height between second end surfaces, a second length between second abutting edges and a second sheet metal thickness, the first height being smaller than the second height and the first length smaller than the second length;

aligning the first and second sheet metal parts with each other, the first sheet metal part being arranged on the second sheet metal part;

connecting the first sheet metal part and second sheet metal part to each other in the aligned state to form a double sheet metal part;

forming the double sheet metal part into an open tubular element, wherein the first sheet metal part is arranged on an inner side of the open tubular element;

connecting the open tubular element at least at the second abutting edges of the second sheet metal part to form a closed tubular element; and connecting at least one drill segment to the closed tubular element.

2. The method as recited in claim 1 wherein the closed tubular element is additionally connected at the first abutting edges of the first sheet metal part.

3. The method as recited in claim 2 wherein the open tubular element is simultaneously connected at the first abutting edges of the first sheet metal part and the second abutting edges of the second sheet metal part.

4. The method as recited in claim 1 further comprising creating at least one slot-shaped recess in the second sheet metal part, the at least one slot-shaped recess having a transverse slot and a connecting slot, and the connecting slot connecting the transverse slot to the second end surface of the second sheet metal part.

5. The method as recited in claim 4 further comprising creating at least one transverse groove in the second sheet metal part, the at least one transverse groove being arranged level with the connecting slot.

6. The method recited in claim 1 wherein at least one internal depression is created in the first sheet metal part, the internal depression extending over the first height of the first sheet metal part.

7. The method as recited in claim 1 wherein the first closed tubular element is formed from a first material and the second closed tubular element from a second material.

8. The method as recited in claim 1 wherein the second sheet metal part is formed at the second abutting edges with at least one second positive form fitting element and at least one corresponding second negative form fitting element, wherein the at least one second positive form fitting element and the at least one second negative form fitting element are connected in a form fitting manner.

9. The method as recited in claim 1 further comprising creating two slot-shaped recesses in the second sheet metal part.

10. The method as recited in claim 9 wherein a transverse groove connects the two slot-shaped recesses.

11. The method as recited in claim 10 wherein each of the two slot-shaped recesses has a transverse slot and a connecting slot, and the connecting slot connecting the transverse slot to the second end surface of the second sheet metal part.

12. The method as recited in claim 7 wherein the, the second material is chosen to address tensile loadings during removal of a jammed drill bit.

* * * * *